United States Patent
Landry

(10) Patent No.: US 8,955,819 B2
(45) Date of Patent: Feb. 17, 2015

(54) CINCH VALVE WITH ELASTIC ELEMENTS

(75) Inventor: Marc S. Landry, Vernon, NJ (US)

(73) Assignee: Acrison, Inc., Moonachie, NJ (US)

( * ) Notice: Subject to any disclaimer, the term of this patent is extended or adjusted under 35 U.S.C. 154(b) by 0 days.

(21) Appl. No.: 13/427,669

(22) Filed: Mar. 22, 2012

(65) Prior Publication Data
US 2013/0248740 A1    Sep. 26, 2013

(51) Int. Cl.
*F16K 7/04* (2006.01)

(52) U.S. Cl.
USPC ............................... 251/4; 251/212; 251/294

(58) Field of Classification Search
CPC ........... F16K 3/03; F16K 7/06; B65B 39/003; B65B 69/0075; B65B 51/00
USPC ..................... 251/5, 7, 9, 212, 294, 336–337; 53/138.3, 138.4, 138.6, 138.8, 137.7, 53/370.6, 370, 139.1, 135.3
See application file for complete search history.

(56) References Cited

U.S. PATENT DOCUMENTS

| | | | |
|---|---|---|---|
| 1,809,091 A | 6/1931 | Wiken | |
| 2,434,835 A * | 1/1948 | Colley | 138/45 |
| 2,569,850 A | 10/1951 | Falconer | |
| 2,846,179 A | 8/1958 | Monckton | |
| 3,473,779 A | 10/1969 | Gustafson et al. | |
| 4,092,010 A * | 5/1978 | Carlson, Jr. | 251/4 |
| 4,322,054 A | 3/1982 | Campbell | |
| 4,401,107 A * | 8/1983 | Haber et al. | 600/30 |
| 4,412,669 A * | 11/1983 | Hanyu et al. | 251/4 |
| 4,518,106 A | 5/1985 | LaFleur | |
| 4,551,862 A | 11/1985 | Haber | |
| 4,553,271 A | 11/1985 | Baker | |
| 4,569,502 A | 2/1986 | Elliott | |
| 4,705,518 A * | 11/1987 | Baker et al. | 623/14.13 |
| 5,155,976 A | 10/1992 | Okabe et al. | |
| 5,340,218 A | 8/1994 | Cuthbertson | |
| 5,495,707 A | 3/1996 | Lauzon | |
| 5,787,689 A | 8/1998 | Dearing | |
| 5,788,449 A | 8/1998 | Riemersma | |
| 5,918,447 A | 7/1999 | Hanten et al. | |
| 6,705,063 B1 | 3/2004 | Topfer et al. | |
| 6,834,995 B1 | 12/2004 | Stevens | |
| 6,860,463 B2 * | 3/2005 | Hartley | 251/4 |
| 6,892,510 B2 | 5/2005 | Sterner et al. | |

(Continued)

FOREIGN PATENT DOCUMENTS

| DE | 1 882 434 | 7/1963 |
|---|---|---|
| DE | 10057104 C1 | 12/2001 |

(Continued)

OTHER PUBLICATIONS

European Search Report dated Mar. 29, 2010, corresponding to European Application No. 09177004.0.

*Primary Examiner* — Marina Tietjen
(74) *Attorney, Agent, or Firm* — Fish & Richardson P.C.

(57) ABSTRACT

A cinch valve includes a first plate with a first aperture, an orbital plate with a second aperture that is substantially aligned with the first aperture. The first plate is arranged to rotate relative to the first plate between a first (open) position and a second (closed) position. The cinch valve includes multiple cables, each of which has a first end coupled to the first plate and a second end coupled to the orbital plate. Rotation of the orbital plate from the first position to the second position causes the plurality of cables to converge and form a woven closure. One or more elastic devices are arranged such that when the plurality of cables converges to form the woven closure, each elastic device urges a corresponding one of the cables in a direction that tends to open the woven closure.

28 Claims, 16 Drawing Sheets

(56) References Cited

U.S. PATENT DOCUMENTS

| | | | |
|---|---|---|---|
| 6,993,891 B2 * | 2/2006 | Richardson et al. | 53/567 |
| 7,032,875 B2 | 4/2006 | Sterner et al. | |
| 7,140,516 B2 * | 11/2006 | Bothor et al. | 222/185.1 |
| 2010/0127194 A1 * | 5/2010 | Landry | 251/7 |

FOREIGN PATENT DOCUMENTS

| | | |
|---|---|---|
| GB | 2250016 A | 5/2002 |
| WO | WO 0181177 | 11/2001 |
| WO | WO 03080446 | 10/2003 |

* cited by examiner

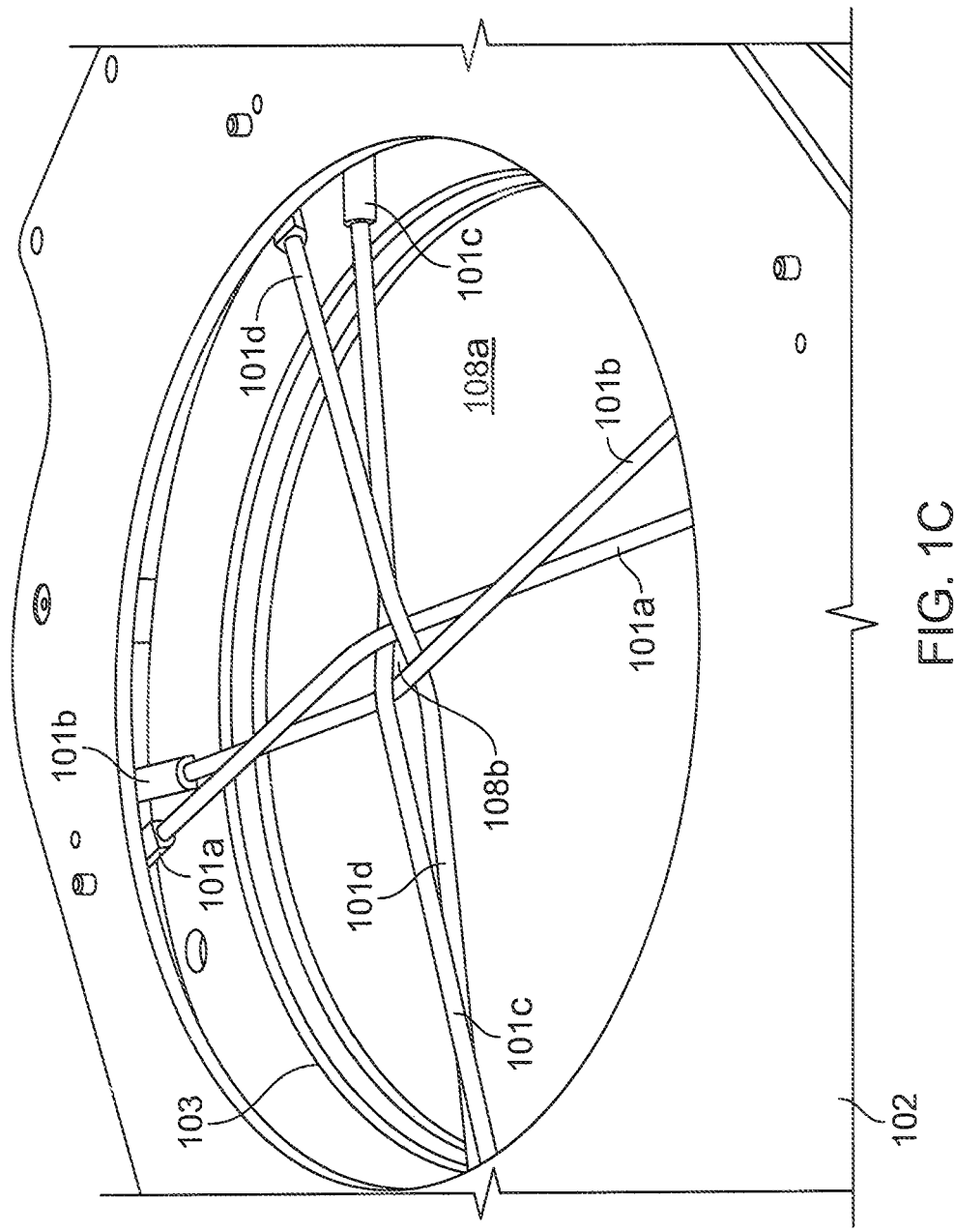

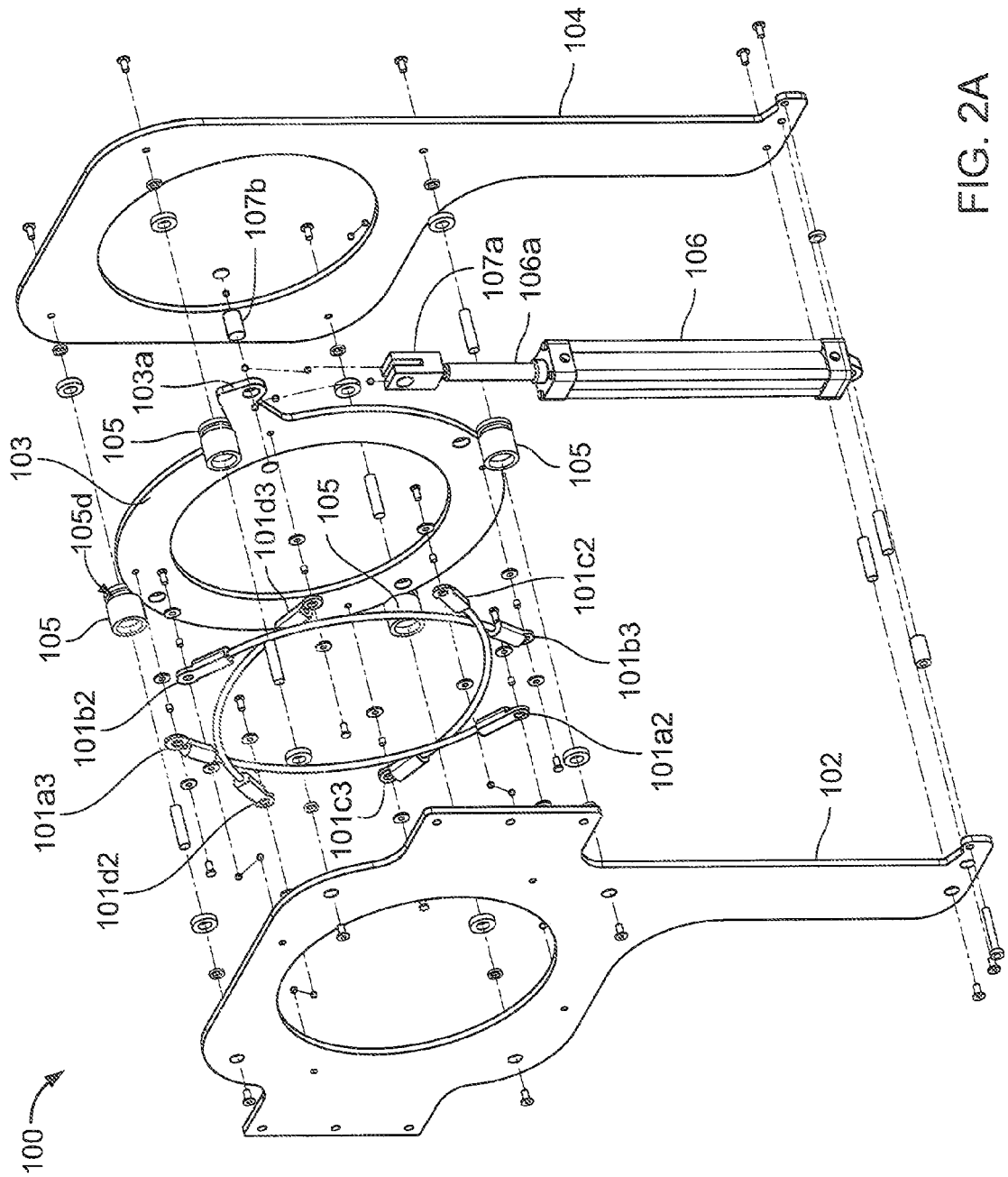

CINCH VALVE WITH ELASTIC ELEMENTS

TECHNICAL FIELD

This disclosure relates to a cinch valve and relates, more particularly, to a cinch valve that includes elastic elements that facilitate valve operation.

BACKGROUND

In the dry solids industry, so-called "bulk bags" have become one of the more popular methods of transporting and storing bulk materials. This change could be due to the reduced cost associated with the usage of bulk bags versus other methods. They are cost effective and easily handled, transported and stored. Typically, bulk bags are constructed of a strong synthetic (e.g., cloth) material and include lifting loops and a discharge spout. For unloading bulk bags, there exist various types of bulk bag unloaders that employ particular mechanisms to effectively unload the material stored within the bulk bags.

There are functional challenges associated with the handling and discharging of material from bulk bags. Vibration and mechanical agitation (e.g., slow moving paddles) are most commonly utilized to assist unloading material from bulk bags, especially those materials that are non-free-flowing, or those that have become packed within the bags during transit and/or storage. An additional change from traditional material handling methods is that many end users of bulk bags use the bulk bags themselves as storage containers (i.e., hoppers) to deliver materials to a process, which eliminates the need for an intermediate hopper. Although bulk bags offer some significant advantages, difficulties arise when a process requires a material change before the bulk bag is empty.

SUMMARY

In one aspect, a cinch valve includes a first plate with a first aperture and an orbital plate with a second aperture that is substantially aligned with the first aperture. The first plate and the second plate are rotatable relative to one another. The orbital plate is arranged to rotate relative to the first plate between a first (open) position and a second (closed) position. The cinch valve includes multiple cables, each of which has a first end coupled to the first plate and a second end coupled to the orbital plate. Rotation of the orbital plate from the first position to the second position causes the plurality of cables to converge and form a woven closure. One or more elastic devices are arranged such that when the cables converge to form the woven closure, the one or more elastic devices urge their respective corresponding cables in a direction that tends to open the woven closure.

In a typical implementation, each cable has multiple strands of wire and may also include a coating material of plastic, rubber or the like, around the strands.

In a typical implementation, the first end of each cable is coupled to the first plate with a first fastener (e.g., a screw or bolt) that extends into the first plate, and the second end of each cable is coupled to the orbital plate with a second fastener (e.g., a screw or bolt) that extends into the orbital plate. The elastic device(s) may be torsion springs, each of which includes a substantially helical body portion wrapped around a respective one of the first or second fasteners, a base portion that extends from a first end of the substantially helical body portion, and a cable urging portion that extends from a second end of the substantially helical body portion.

In such implementations, the base portion may be coupled either to the first plate or to the orbital plate (e.g., by extending into a hole in the first plate or orbital plate). Moreover, in such implementations, the cable urging portion is configured to contact the cable (or connecting lug on the cable) to provide a physical impetus to urge the cable in a direction that tends to open the woven closure.

In certain embodiments, the one or more elastic devices are compression springs. In such embodiments, each compression spring is connected at one end to one of the cables (or connecting lugs) and at the other end to either the first plate or the orbital plate. Moreover, each compression spring is configured such that when an associated one of the cables is moved toward the woven closure position, the compression spring is compressed and, therefore, exerts a force on the cable that tends to push the cable out of the woven closure position.

In certain embodiments, the one or more elastic devices are extension springs. In such embodiments, each extension spring is connected at one end to one of the cables (or connecting lugs) and at the other end to either the first plate or the orbital plate. Moreover, each compression spring is configured such that when an associated one of the cables is moved toward the woven closure position, the compression spring is compressed and, therefore, exerts a force on the cable that tends to push the cable out of the woven closure position.

In some implementations, the cinch valve includes a first elastic device proximate the first end of each cable and a second elastic device proximate the second end of the each cable. The first and second elastic devices may be of the same type or may be different types.

In certain embodiments, the cinch valve has four cables, wherein in the first position, a flexible portion proximate to the first end of the first cable overlaps a flexible portion proximate to the second end of the third cable, a flexible portion proximate to the first end of the fourth cable overlaps a flexible portion proximate to the second end of the first cable, a flexible portion proximate to the first end of the second cable overlaps a flexible portion proximate to the second end of the fourth cable, and a flexible portion proximate to the first end of the third cable overlaps a flexible portion proximate to the second end of the second cable.

Moreover, in the woven closure, a flexible portion of the first cable passes over a flexible portion of the third cable and passes under a flexible portion of the fourth cable, a flexible portion of the second cable passes under a flexible portion of the third cable and passes over a flexible portion of the fourth cable, a flexible portion of the third cable passes under a flexible portion of the first cable and passes over a flexible portion of the fourth cable, and a flexible portion of the fourth cable passes over a flexible portion of the first cable and passes under a flexible portion of the second cable.

According to certain implementations, the cinch valve has a lower plate having a third aperture substantially aligned with the first and second apertures and the orbital plate is disposed between the upper and lower plates. Grooved bearings are coupled to the upper and lower plates. Each grooved bearing has a groove arranged to receive an edge of the orbital plate.

Some embodiments include an actuator coupled to the orbital plate. Typically, the actuator is operable to cause the orbital plate to rotate, relative to the first plate, between the first position and the second position (e.g., between an open position and a closed position).

In particular implementations, the cables are configured such that when the cables form the woven closure, each cable passes over two of the cables then under two of the cables, one of which is one of the cables it passed over.

In another aspect, a bulk bag unloading apparatus includes a frame arranged to support a bulk bag and a cinch valve coupled to the frame and disposed proximate to a spout end of the frame. The cinch valve includes a first plate with a first aperture, an orbital plate that is rotatable relative to the first plate. The orbital plate has a second aperture that is substantially aligned with the first aperture. The orbital plate is arranged to rotate relative to the first plate between a first position and a second position.

The cinch valve in the bulk bag unloading apparatus has multiple cables, each of which has a first end coupled to the first plate and a second end coupled to the orbital plate. Rotation of the orbital plate from the first position to the second position causes the plurality of cables to converge and form a woven closure. The cinch valve further includes one or more elastic devices. The one or more elastic devices are arranged such that when the cables converge to form the woven closure, each elastic device urges a corresponding one of the cables in a direction that tends to open the woven closure.

In various implementations, the cinch valve in the bulk bag unloading assembly includes one or more of the features mentioned above.

Moreover, in some implementations, the bulk bag unloading assembly has a paddle-type unloader or vibratory unloader coupled to the frame and disposed proximate to the spout end of the frame.

In yet another aspect, a cinch valve includes a first plate with a first aperture, and an orbital plate with a second aperture substantially aligned with the first aperture. The orbital plate is arranged to rotate relative to the first plate between a first position and a second position. The cinch valve includes cables, each having a first end coupled to the first plate and a second end coupled to the orbital plate. Rotation of the orbital plate from the first position to the second position causes the cables to converge and form a woven closure in approximate alignment with a central axis that passes through the first and second apertures. The cinch valve further includes a means for urging the cables in a direction that opens the woven closure when the cables are converged to form the woven closure.

The details of one or more implementations are set forth in the accompanying drawings and the description below. Other features and advantages will be apparent from the description and drawings, and from the claims.

BRIEF DESCRIPTION OF DRAWINGS

FIG. 1C is a view of the closure.

FIG. 2A is an exploded view of an implementation of a cinch valve.

DETAILED DESCRIPTION

The following is a description of some preferred implementations, as well as some alternative implementations, of a cinch valve.

I. Overview

A cinch valve can close-off the discharge spout of a partially emptied bulk bag, typically when process stipulations require a material change before the bulk bag is empty to avoid the need for a processor to discharge the entire contents of the bag before a material change can be implemented, which can be costly and time consuming. A cinch valve allows for the closure of a partially emptied bulk bag when such a product change is required.

In some implementations, this is accomplished with a series of four cables mounted about 90 degrees apart. For example, one end of each cable is attached to an upper fixed mounting plate; the other is attached to a rotating orbital plate. In some implementations, the cables comprise portions that are flexible. For example, substantially the entire cable can be flexible. In a typical implementation, each cable includes multiple strands of wire and may, optionally, be covered with a plastic or rubber coating material.

The orbital plate is captured within the cinch valve by grooved bearing (bushing) idlers that constrain the orbital plate in position, while still allowing the orbital plate to rotate. This orbital plate is attached to a linear actuator (e.g., pneumatic air cylinder) via a clevis and pin arrangement.

Figure 3:
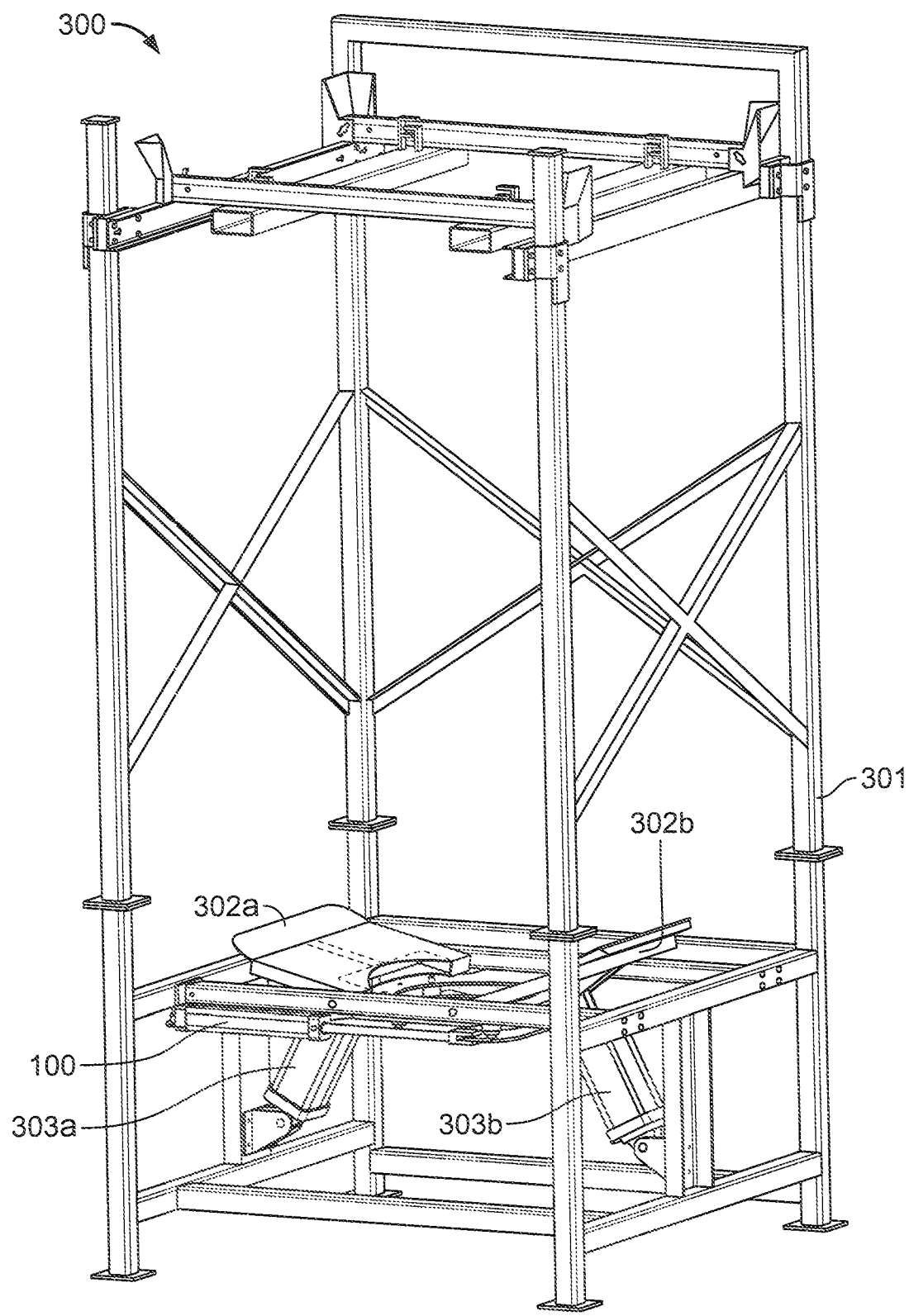
FIG. 3 is a view of a cinch valve mounted as part of a bulk bag unloader assembly.

In some implementations, the bulk bag is mounted just above the cinch valve assembly either onto a vibrating bulk bag unloader or mechanical paddle type unloader (see, e.g., FIG. 3). The spout of the bulk bag is then drawn down through the cinch valve aperture and attached to the process equipment located below. The bulk bag spout tie is then opened and material begins to flow. The vibrating or mechanical paddle type bulk bag unloader is activated to maintain product flow. In some implementations, it is advantageous to make the entire assembly dust-tight.

If, during the product discharge process, a user requires a material change, the pneumatic cylinder of the cinch valve is actuated. This action causes the orbital plate to rotate in the direction of the pneumatic air cylinder, rotating about the center axis through a cinch valve aperture. Since one end of each cable is affixed onto this orbital plate, the cables rotate toward the center of the cinch valve assembly. This movement causes all four cables to converge toward the center point of the valve when the air cylinder is fully contracted. In some implementations, the cables are arranged such that they overlap each other to form a secure closure upon convergence (see, e.g., FIGS. 1B and 1C). This action constricts the bulk bag discharge spout and effectively cinches the discharge spout along a short length of the bag (e.g., the height of the woven closure, which in some implementations is about twice the thickness of a cable) and thereby allows for easy tie-off of the bag spout. Once the bulk bag has been properly tied off, it can be removed and stored, and another bulk bag (e.g., containing a different material) can be loaded in its place.

II. Implementations of a Cinch Valve

Figure 1A:
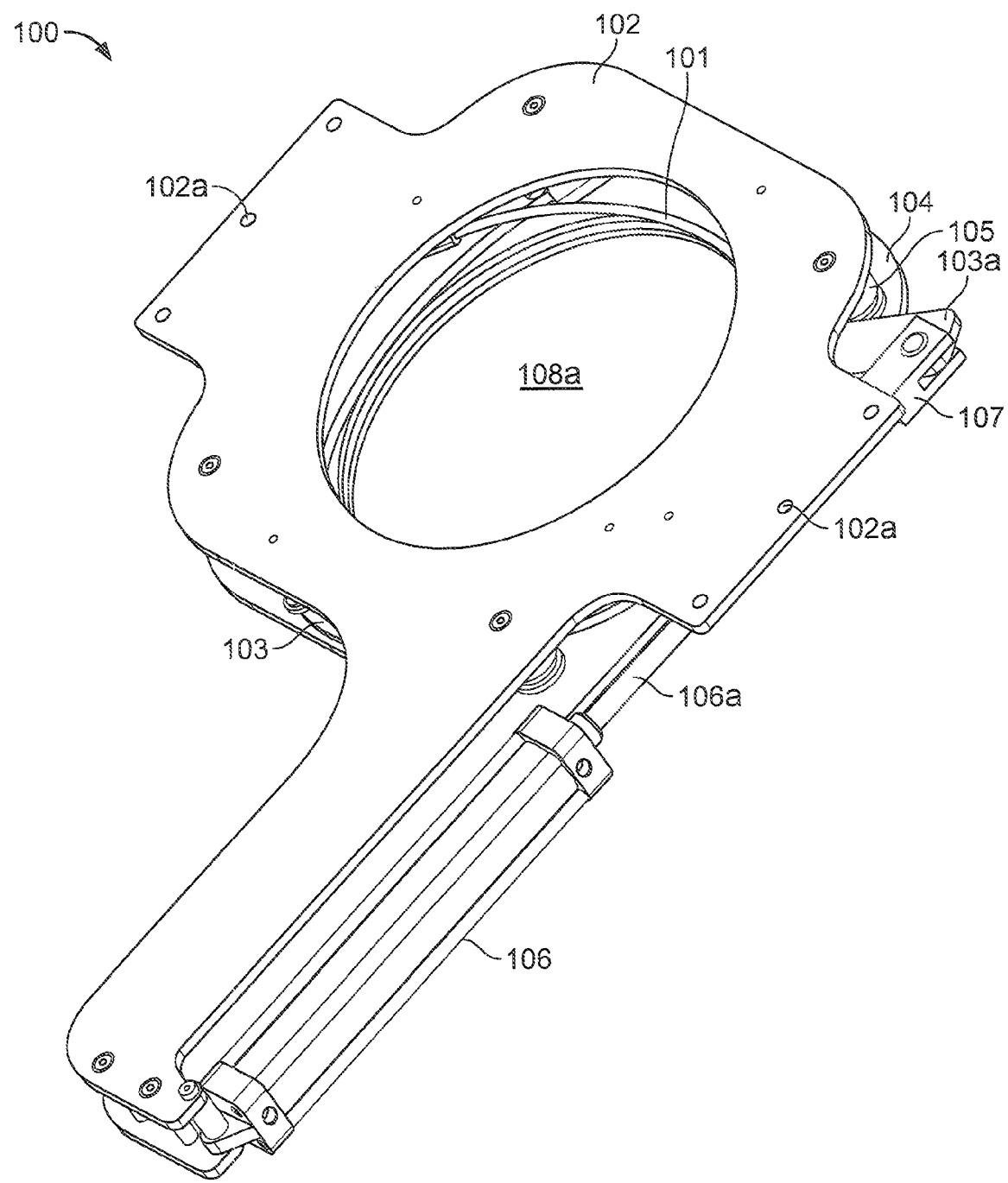
FIG. 1A is a perspective view of an implementation of a cinch valve in the open position.

FIG. 1A illustrates a perspective view of an implementation of a cinch valve 100. The spout of a bulk bag would be placed through the valve opening 108a. The cinch valve 100 includes an upper fixed mounting plate 102, a rotating orbital plate 103 (see also FIG. 2A) and a lower fixed plate 104. The plates 102-104 each have apertures that together define opening 108a. The upper fixed mounting plate 102 includes mounting features 102a that allow securing the cinch valve 100 to, e.g., a bulk bag unloading assembly (see FIG. 3). The rotating orbital plate 103 is kept aligned between the upper and lower plates 102 and 104, respectively, by one or more grooved bearing (bushing) idlers 105. The bearing idlers 105 allow the orbital plate 103 to rotate, but substantially constrain it from translating in other directions.

A linear actuator 106 causes rod 106a to translate. The linear actuator 106 can be powered, e.g., by an electric motor, hydraulics, or pneumatics. In some implementations, the plate 103 comprises gear teeth that mate with gear teeth coupled to a rotational actuator to thereby rotate the plate 103. The rod 106a is coupled to the rotating orbital plate 103 at a mount 103a by way of a clevis and pin assembly 107. As the rod 106a translates, the rotating orbital plate 103 rotates. In this implementation, as the rod 106a retracts into actuator 106, it causes the orbital plate 103 to rotate in a clockwise direction and as the rod 106a extends, it causes the orbital plate 103 to rotate in a counter-clockwise direction. Rotation of the orbital plate 103 in a clockwise direction causes the cables of cable assembly 101 to converge, thereby sealing the bulk bag and rotation of the orbital plate in a counter-clockwise direction causes the cables of the cable assembly 101 to separate, thereby allowing material to flow out of the bulk bag.

In some implementations, the upper fixed mounting plate 102, rotating orbital plate 103 and lower fixed plate are made of carbon steel, but other materials can be used (e.g., aluminum, stainless steel, titanium, etc.). In some implementations, the materials are chosen to be non-reactive with the material being handled. In some implementations, the material is coated to provide insulation from the material being handled or from the environment to which it is exposed. In some implementations, the cables of the cable assembly 101 comprise carbon steel, stainless steel or galvanized wire that can be coated with urethane, polyester, vinyl, polyethylene, PVC, nylon, PTFE, fluoropolymer, etc.

Figure 1B:
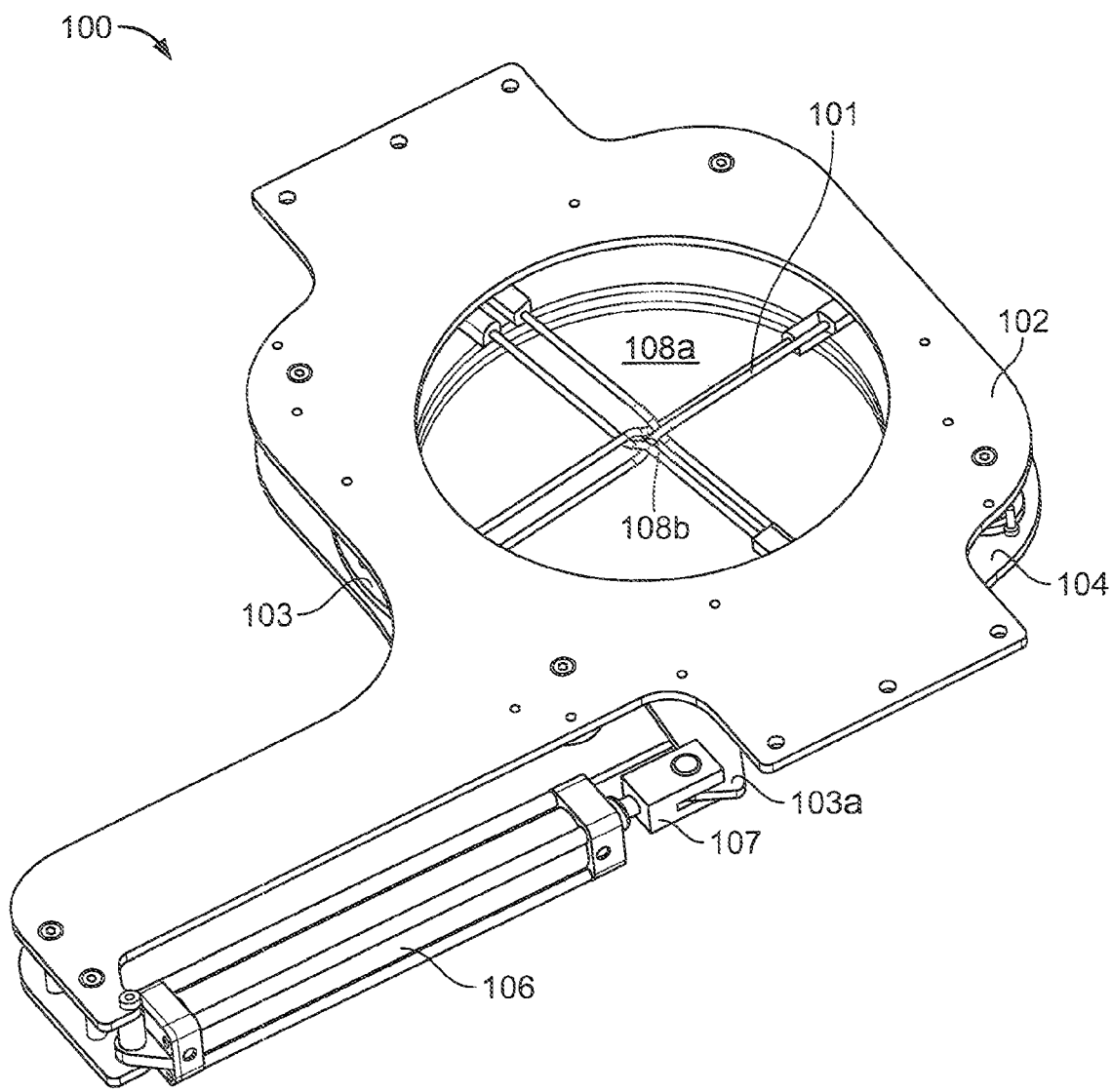
FIG. 1B is a perspective view of an implementation of a cinch valve in the closed position.

FIG. 1B illustrates the cinch valve 100 in the closed position. The linear actuator caused the rod 106a to retract, thereby rotating the orbital plate 103 in a clockwise manner. The opening 108a (see FIG. 1A) has been sealed by cable assembly 101 to form the closure 108b (see FIGS. 1B, 1C). As shown, the cables of the cable assembly 101 weave with one another to create a tight seal, thereby facilitating closure and allowing for the tie off of a bulk bag. The weaving is achieved by using cables comprising flexible portions. The closure 108b is located approximately in the center of the aperture defined by the orbital plate 103. In this implementation, the apertures defined by the plates 102, 103 and 104 are coaxial and substantially circular and, therefore, share substantially the same center. That arrangement is not required in all implementations. Some implementations can include one or more apertures that are not circular and/or not coaxial.

FIG. 1C illustrates in more detail how the cables of the cable assembly 101 weave with one another and form closure 108b. The cable assembly includes four cables 101a, 101b, 101c and 101d. Starting with the uppermost quadrant of the opening 108a, one end of cable 101a is mounted to the upper fixed mounting plate 102 and one end of cable 101b is mounted to the orbital plate 103. As shown in the lowermost quadrant of the opening 108a, the other end of cable 101a is mounted to the orbital plate 103 and the other end of cable 101b is mounted to the upper fixed mounting plate 102. At the leftmost quadrant of the opening 108a, cable 101c is mounted to the upper fixed mounting plate 102 and one end of cable 101d is mounted to rotating orbital plate 103. At the rightmost quadrant of the opening 108a, the other end of cable 101c is mounted to the rotating orbital plate 103 and the other end of cable 101d is mounted to the upper fixed mounting plate 102. As a result, when forming the closure 108b, (1) cable 101a overlaps cable 101c and passes under cable 101d, (2) cable 101b passes under cable 101c and overlaps cable 101d; (3) cable 101c overlaps cable 101b and passes under cable 101a; and (4) cable 101d passes under cable 101b and overlaps cable 101a. The resulting woven closure 108b securely closes a bulk bag in a manner that allows easy tie off. One particular advantage is that by converging the closure 108b into a weave, the bulk bag is tightly sealed (e.g., a 5.08 cm (2 in) to 1.905 cm (¾ in) diameter cinch or less, depending on the thickness of the bag material) substantially within the distance between the upper fixed mounting plate 102 and the orbital plate 103, or less. In some implementations, the bag is sealed within the distance substantially equally to the thickness of two cables (e.g., 101a, 101b, 101c or 101d). In some implementations each cable is about 0.635 cm (0.25 in) thick, thereby creating a cinch that is about 1.27 cm (0.5 in) along the length of the bag. Actual closure heights can range, e.g., between 0.635 cm (0.25 in) to 2.54 cm (1 in), depending on the size of the mechanism. This facilitates tying off a bag and creating a tight seal, as compared to designs in which, for example, the sealing members do not form a weave with each other.

When the cables are configured to form the woven closure (as shown in FIG. 1C), each cable (or cable assembly) passes over two other cables then under two cables, one of which is the same cable it went over.

Figure 1D:
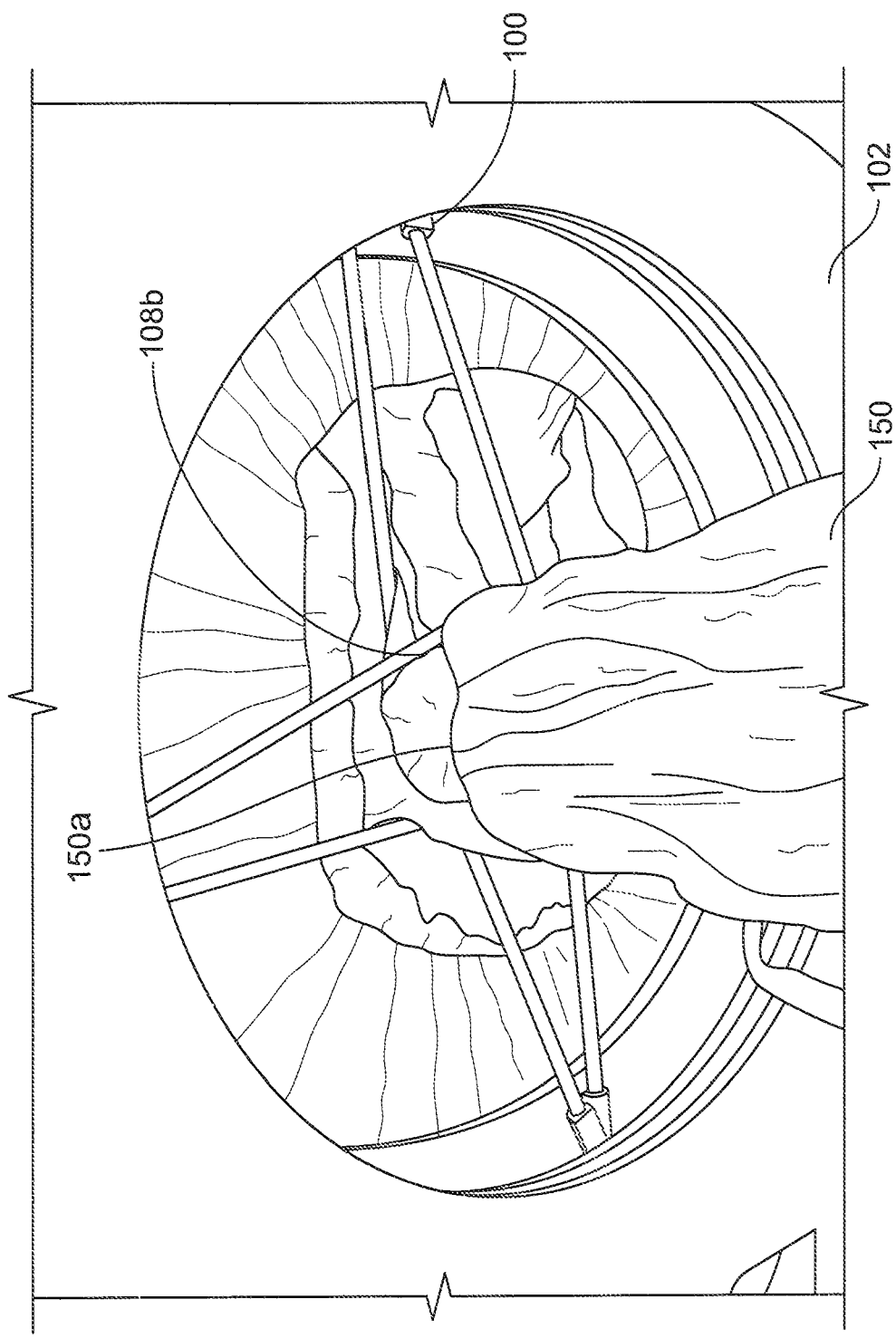
FIG. 1D illustrates a bag sealed by the closure.

FIG. 1D illustrates a bag 150 sealed by the closure 108b. The woven closure 108b gathers the bag 150 into a cinch 150a that facilitates tying off the bag 150. The cinch 150a is in substantially the same plane as the closure 108b. The length of the cinch 150a is about equal to the thickness of two cables, but can be somewhat greater depending on the thickness and/or stiffness of the bag material.

FIG. 2A is an exploded view of an implementation of a cinch valve 100. At opposing ends are the upper fixed mounting plate 102 and the lower fixed plate 104.

One end of cable 101a is mounted to the upper fixed mounting plate 102 (101a2) and the other end is mounted to the orbital plate 103 (101a3). One end of cable 101b is mounted to the upper fixed mounting plate 102 (101b2) and the other end is mounted to the orbital plate 103 (101b3). One end of cable 101c is mounted to the upper fixed mounting plate 102 (101c2) and the other end is mounted to the orbital plate 103 (101c3). One end of cable 101a is mounted to the upper fixed mounting plate 102 (101d2) and the other end is mounted to the orbital plate 103 (101d3). This overlapping arrangement allows the cables, when converged, to form a weave that tightly seals the outlet spout of a bulk bag.

The linear actuator 106 is mounted between the upper fixed mounting plate 102 and the lower fixed plate 104. At the end of the rod 106a is a clevis 107a. The clevis 107a couples to an actuator mount 103a of the orbital plate 103 by a pin 107b. The pin 107b is rotatable relative to the clevis 107a.

The upper and lower plates (102 and 104, respectively) are separated by, among other things, a plurality of grooved bearing (bushing) idlers 105. Each idler 105 comprises a groove 105d that engages an edge of the orbital plate 103. The idlers 105 allow the orbital plate 103 to rotate as the actuator 106 moves rod 106a, but the grooves 105d substantially prevent linear translation between the upper and lower plates (102 and 104, respectively).

Figure 2B:
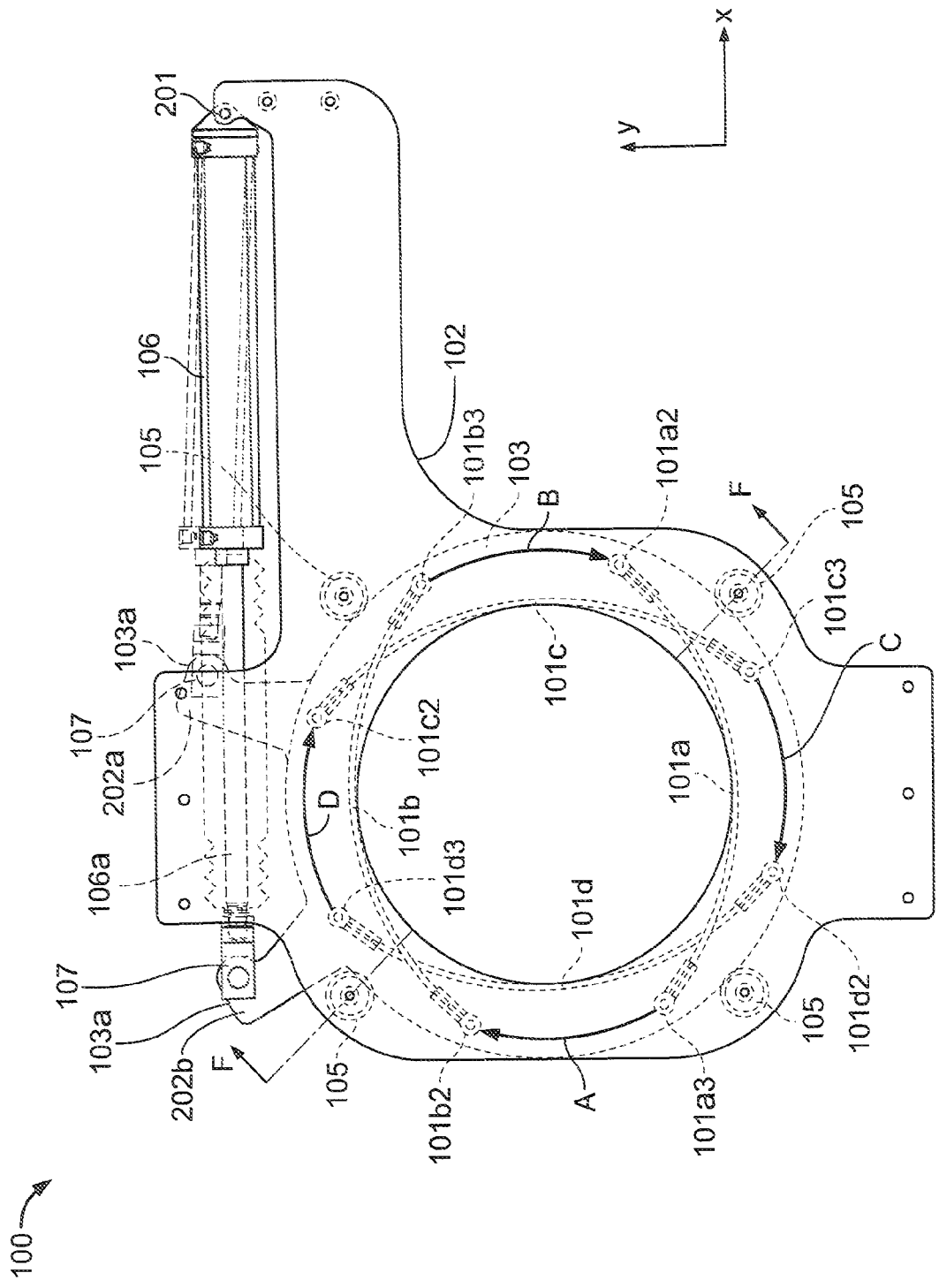
FIG. 2B is a view of an implementation of a cinch valve with the upper fixed mounting plate illustrated as substantially transparent.

FIG. 2B is a view of an implementation of a cinch valve 100 with the upper fixed mounting plate 102 illustrated as substantially transparent. The actuator 106 is shown moving the orbital plate 103 to two positions, open (202b) and closed (202a). As shown, the location in the y-direction of the orbital plate actuator mount 103a varies depending upon its position. Accordingly, the actuator 106 is mounted on a pivot 201 that allows the actuator to adjust its angle to accommodate the position of the actuator mount 103a as it moves.

This view, which illustrates plate 102 as transparent, reveals how the edge of the orbital plate 103 couples with the groove of the idlers 105, thereby enabling rotation. This view also reveals the movement of the individual cables 101a-d. As the actuator 106 causes the orbital plate 103 to move from position 202b to 202a, the cables 101a-d move as follows:

(i) end 101a3 of cable 101a, which is attached to orbital plate 103, moves along the path of arrow "A", whereas end 101a2 remains in place because it is attached to upper fixed mounting plate 102;

(ii) end 101b3 of cable 101b, which is attached to orbital plate 103, moves along the path of arrow "B", whereas end 101b2 remains in place because it is attached to upper fixed mounting plate 102;

(iii) end 101c3 of cable 101c, which is attached to orbital plate 103, moves along the path of arrow "C", whereas end 101c2 remains in place because it is attached to upper fixed mounting plate 102; and (iv) end 101d3 of cable 101d, which is attached to orbital plate 103, moves along the path of arrow "D", whereas end 101d2 remains in place because it is attached to upper fixed mounting plate 102.

The cinch valve in FIG. 2B is in a completely open position (i.e., every cable is positioned between the orbital plate 103 and the upper fixed mounting plate 102 and does not extend at all into the aperture formed by the openings the orbital plate 103 and the upper fixed mounting plate 102, through which a bag spout may pass). In this position, in the illustrated implementation, each cable crosses two other cables.

Figure 2C:
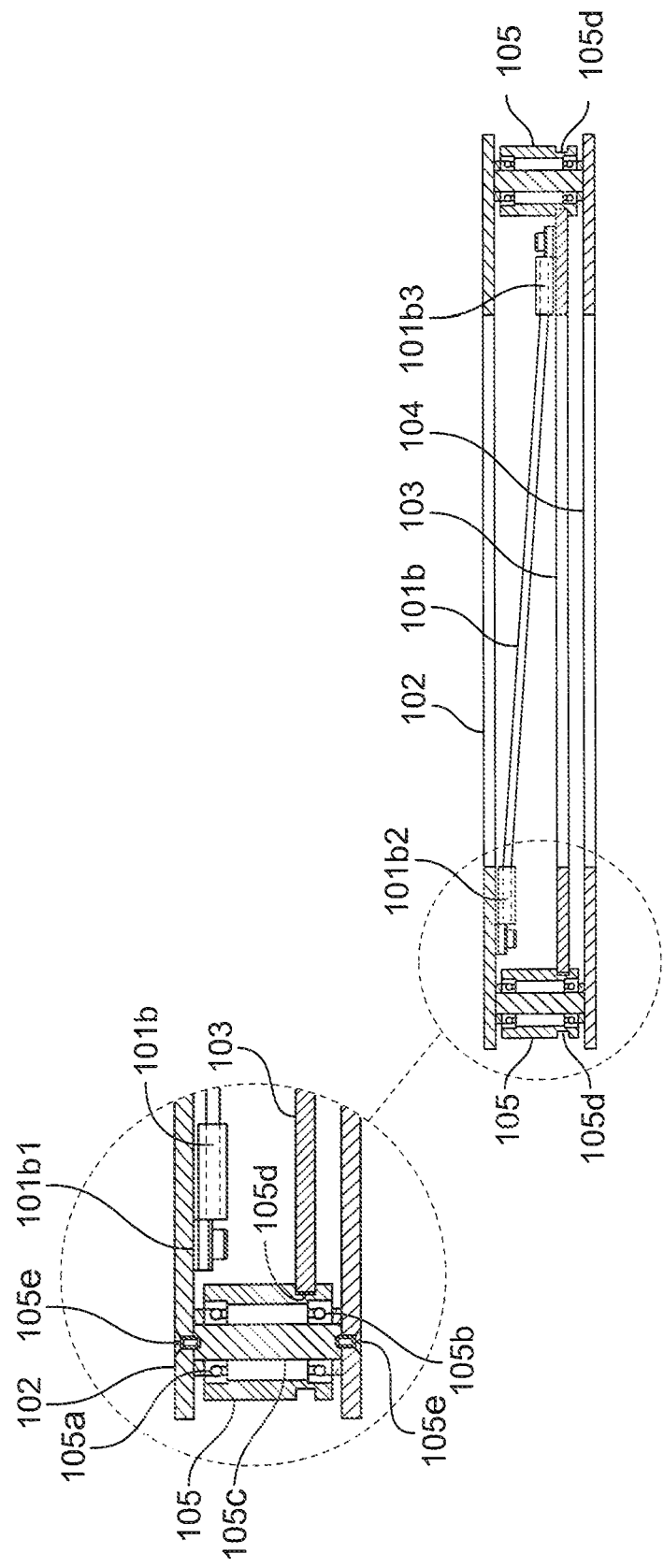
FIG. 2C is a cross-sectional view of an implementation of a cinch valve.

FIG. 2C illustrates two views taken through the line F-F of FIG. 2B. This view illustrates one cable 101b mounted on one end (101b2) to the upper fixed mounting plate 102 and mounted on the other end (101b3) to the orbital plate 103. The cable 101 is mounted to the plates by a mounting post 101b1, which in some implementations is a metal collar with a hole that a screw or other fastener passes through. In some implementations, the woven closure 108b is formed in the space between plates 101 and 103.

This view also illustrates the edge of the orbital plate 103 mating with the groove 105d of the idler 105. The idler 105, in this implementation, includes an upper bearing assembly 105a, lower bearing assembly 105b and central post 105c. In some implementations, the upper and lower bearing assemblies are replaced with bronze bushings (or other bushing materials). The central post 105c is attached to the upper fixed mounting plate 102 and lower fixed plate 104 by fasteners 105e (e.g., screws).

FIG. 3 illustrates a cinch valve 100 implemented in a bulk bag unloader assembly 300. The bulk bag unloader assembly includes a frame 301 that supports the bulk bag in a manner such that the spout of the bag passes through the opening 108a of the cinch valve 100 (i.e., the cinch valve 100 is disposed proximate to the spout end of the frame 301). To facilitate unloading of the bulk bag contents, mechanical paddle-type unloaders 302a and 302b (each powered by respective pneumatic cylinders 303a and 303b) agitate the bulk bag.

III. Alternative Implementations of a Cinch Valve

Figure 4:
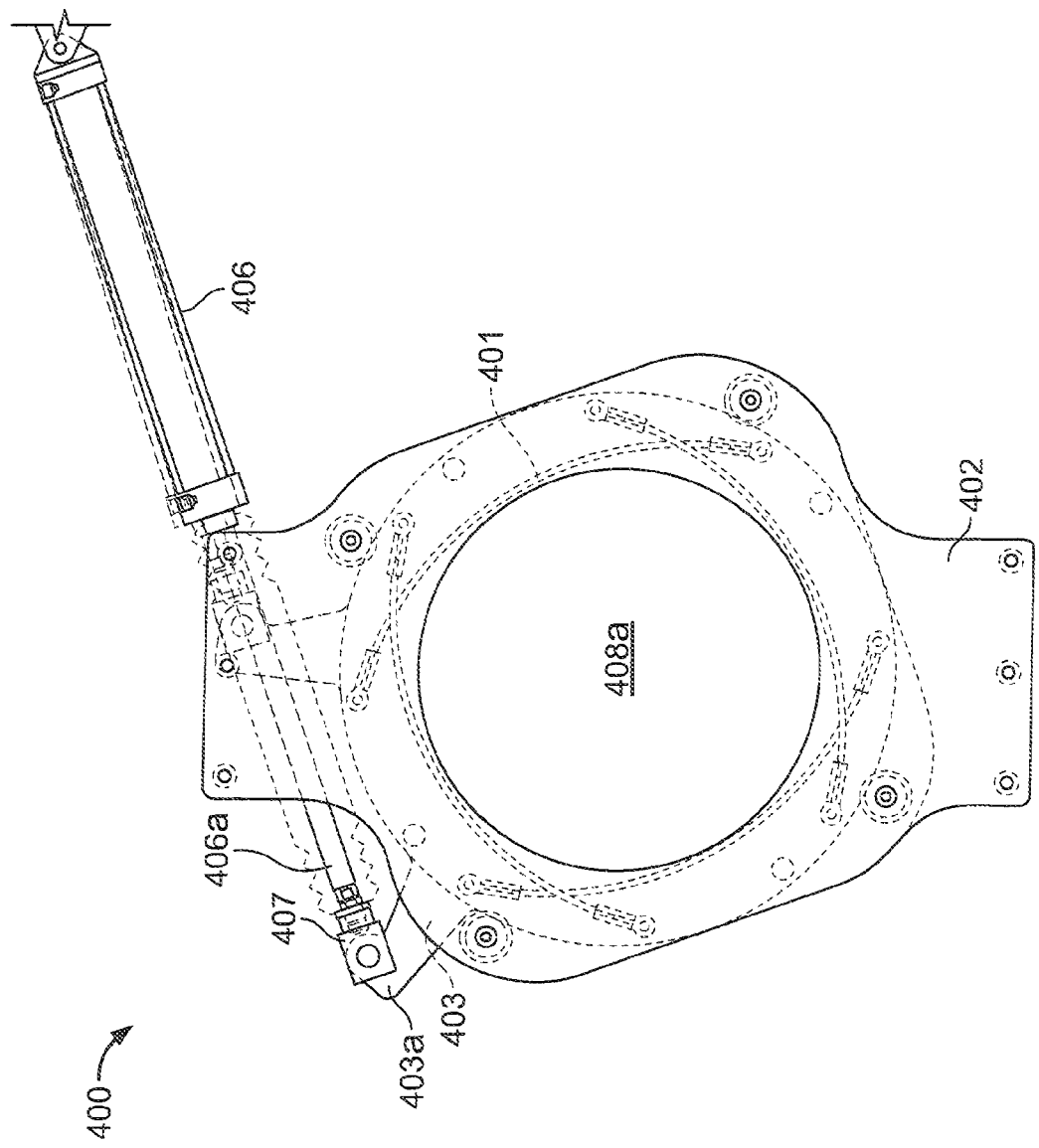
FIG. 4 is a view of an alternate implementation of a cinch valve.

FIG. 4 illustrates an alternative implementation of a cinch valve 400. Like the implementation of, e.g., FIG. 1A, the cinch valve 400 includes a linear actuator 406 having a rod 406a coupled to an actuator mount 403a of an orbital plate 403. An upper fixed mounting plate 402, the orbital plate 403 and lower fixed plate (not visible) define an opening 408a. The opening 408a can be constrained by a woven closure formed by cable assembly 401. A main difference between this implementation and that of, e.g., FIG. 1A, is that the opening 408a seals (i.e., the cable assembly 401 forms a woven closure) when the rod 406a extends, as opposed to when it retracts. The arrangement of, e.g., FIG. 1A can be desirable when hydraulic or air cylinders are used because, e.g., they are often more tolerant of stress or offer greater force when contracting rather than when extending. This arrangement (400) can be desirable when an actuator 406 is used that, e.g., better tolerates stress or offers greater force when it is extending.

IV. Advantages of Flexible Cable

Some implementations utilize cables having flexible portions (see, e.g., cables 101). For example, in some implementations, substantially the entire cable is flexible. Cables having flexible portions can offer advantages over designs that use inflexible converging members (e.g., rigid bars). For example, cables (e.g., 101) can offer a tighter seal than inflexible bars due to, e.g., the ability to form a woven closure. This advantage is pronounced when the bulk bag being sealed carries a fine material (e.g., small particulates). Moreover, since the woven closure can provide a cinch that is as short as the thickness of two cables, tying off a bag is made easier. Also, since bulk bags are often re-used, cables (e.g., 101) can be gentler on bags than other closures, reducing the likelihood of damage as a result of sealing.

Other advantages relate to the mechanical simplicity afforded by using cables (e.g., 101) as opposed to inflexible members. For example, some of the implementations described herein utilize a single linear actuator and have relatively few joints as compared to designs that use inflexible members.

V. Elastic Elements

In some implementations, such as the implementation shown in FIGS. 1-3, when the actuator 106 is operated to move the cables 101a, 101b, 101c, 101d from a position where they form a woven closure in approximately the center of the aperture (as in FIG. 1B, for example) to an open position (as in FIG. 2B, for example), the cables 101a, 101b, 101c, 101d may bind together and resist moving apart from one another. In some such instances, this binding can cause one or more of the cables 101a, 101b, 101c, 101d to change its orientation from presenting a concave bend toward the center of the aperture (as in FIG. 2B, for example) to presenting a convex bend toward the center of the aperture (as cable 101b is in FIG. 5, for example).

Figure 5:
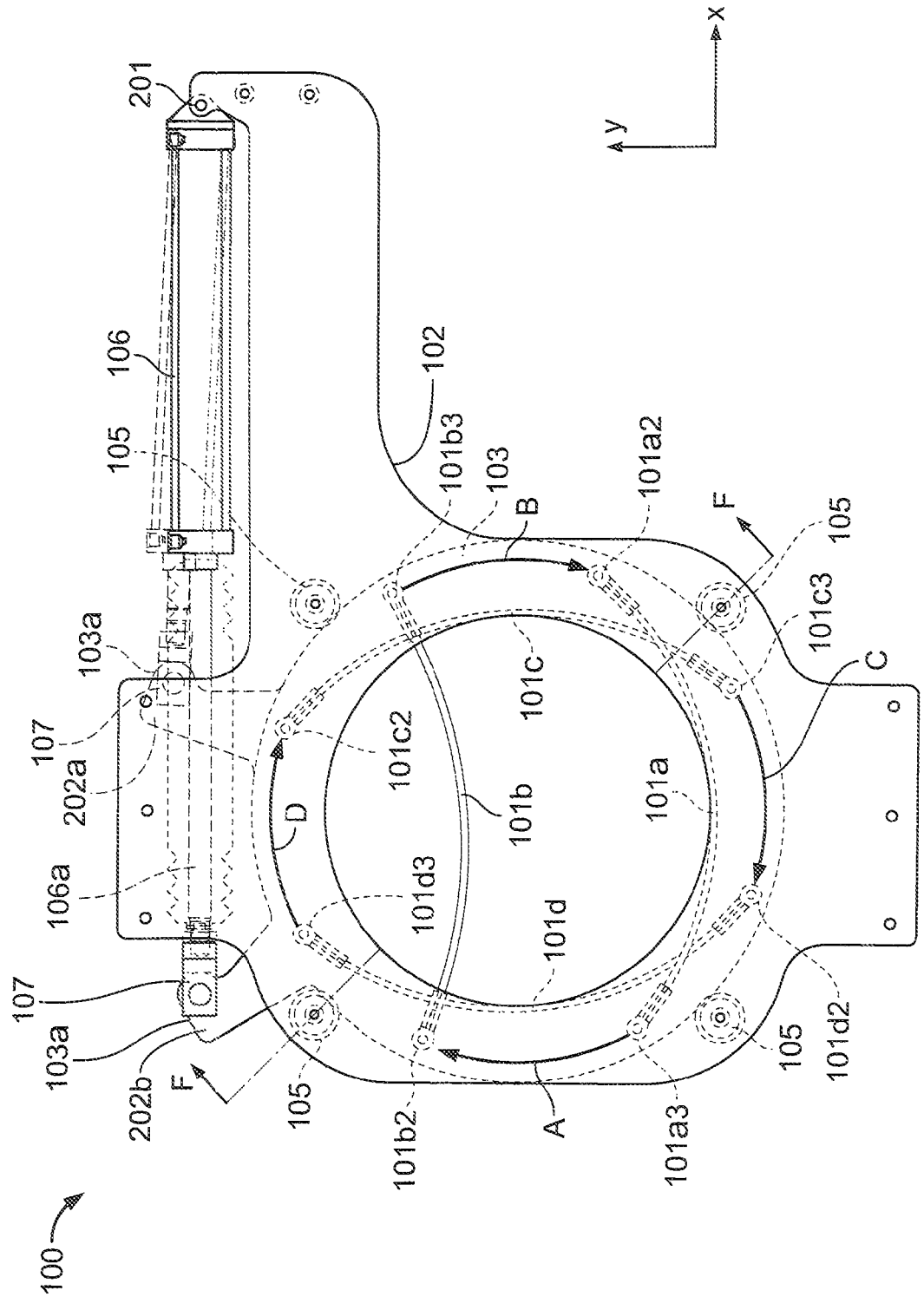
FIG. 5 is a view of an implementation of a cinch valve with the upper fixed mounting plate illustrated as substantially transparent.

If one (or more) of the cables 101a, 101b, 101c, 101d ends up with a flipped orientation (i.e., presenting a convex bend toward the center of the aperture, as cable 101b is in FIG. 5), this may inhibit the spout of the bulk storage bag from fully opening and, thereby, restrict the flow of material out of the bulk storage bag at least somewhat. When this happens, a human operator can correct the flipped cable condition by reaching into the area where the flipped cable is located and pushing the flipped cable in an outward direction to reverse its orientation so that it presents a concave orientation toward the center of the aperture (as all of the cables in FIG. 2B are).

Requiring a human operator to reach into the area where the flipped cable is located and push the flipped cable outward to correct this condition is labor intensive, easy to overlook and potentially dangerous.

Therefore, in some implementations, the cinch valve includes one or more elastic elements (e.g., springs) configured to urge one or more of the cables 101a, 101b, 101c, 101d in an outward direction relative to the center of the aperture. In a typical implementation, the presence of such elastic elements helps prevent the occurrence of cable flipping altogether.

Figure 6:
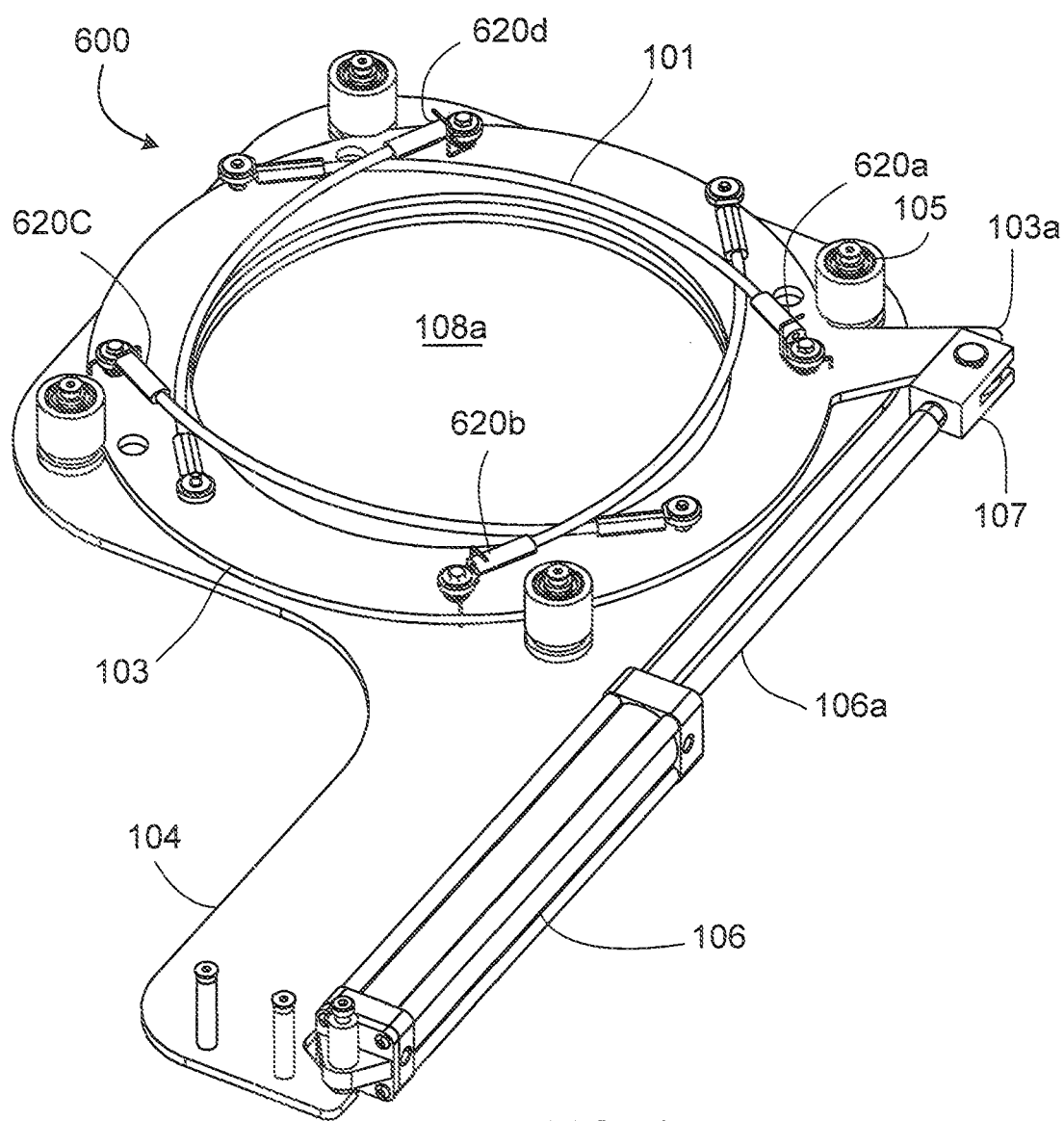
FIG. 6 is a partial perspective view of a cinch valve with elastic members (e.g., torsion springs).
Figure 7:
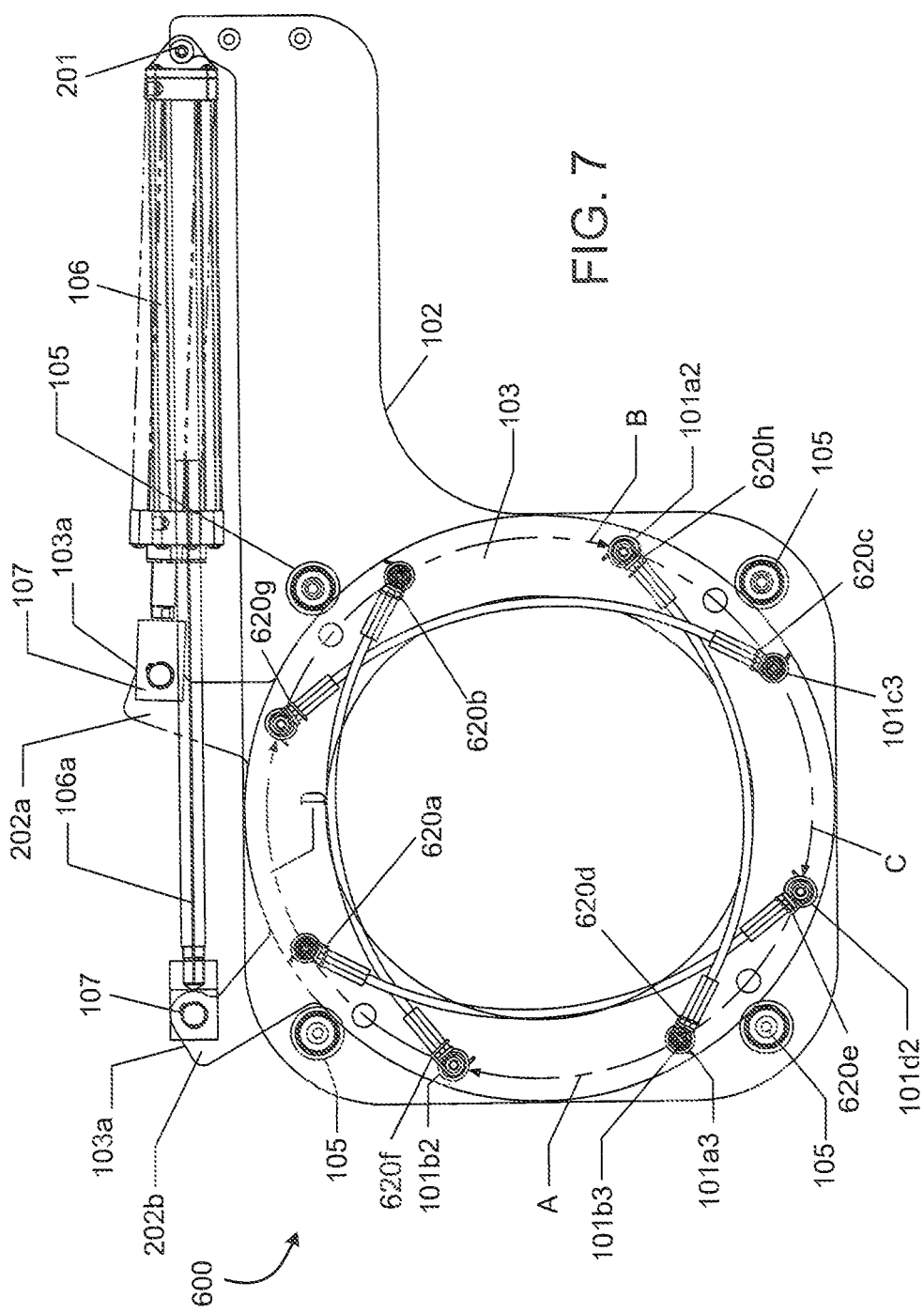
FIG. 7 is a partial top view of a cinch valve with elastic members (e.g., torsion springs).
Figure 8:
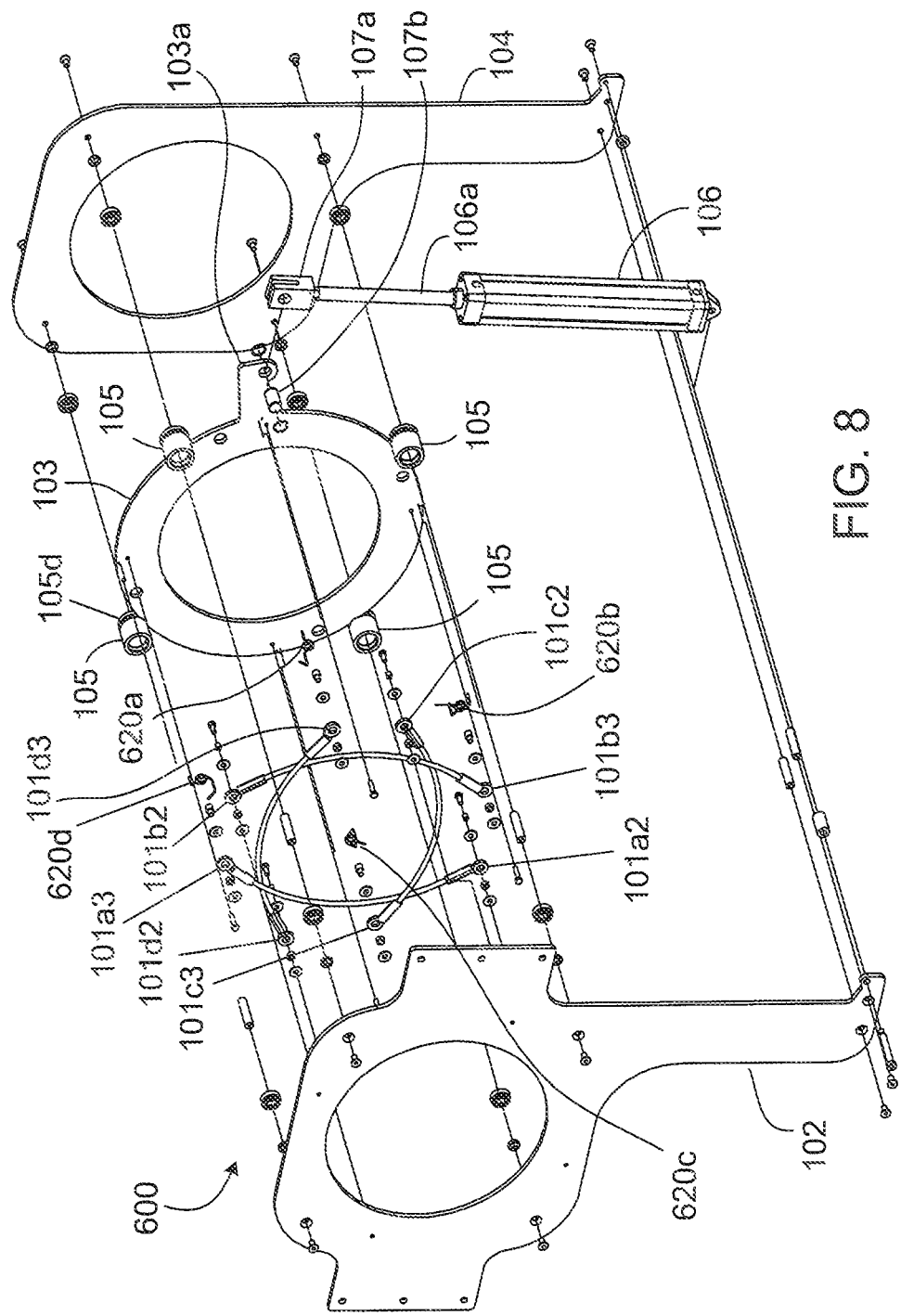
FIG. 8 is an exploded view of an implementation of a cinch valve with elastic members (e.g., torsion springs).

FIGS. 6-8 represent an exemplary implementation of a cinch valve 600 that is similar to the cinch valve 100 in FIGS. 1A-3. However, cinch valve 600 has a plurality of elastic elements 620a, 620b, 620c, 620d, each of which is configured to urge a corresponding one of the cable assemblies 101a, 101b, 101c, 101d in an outward direction relative to a center of the aperture, through which the bulk storage bag's spout can pass. In the illustrated implementation, each elastic element 620a, 620b, 620c, 620d is a torsion spring that is securely coupled to the orbital plate 103 and configured so that the torsion springs become wound up (i.e., with increased storage of mechanical energy) when the cables 101a, 101b, 101c, 101d move toward the center of the aperture to form the woven closure. As the torsion springs become wound up, they increasingly tend to urge the cables 101a, 101b, 101c, 101d away from the center of the aperture and out of the woven closure position. As illustrated in FIG. 7, elastic elements 620e, 620f, 620g, 620h can also be present proximate the second ends of each of the four cables.

Figure 9A:
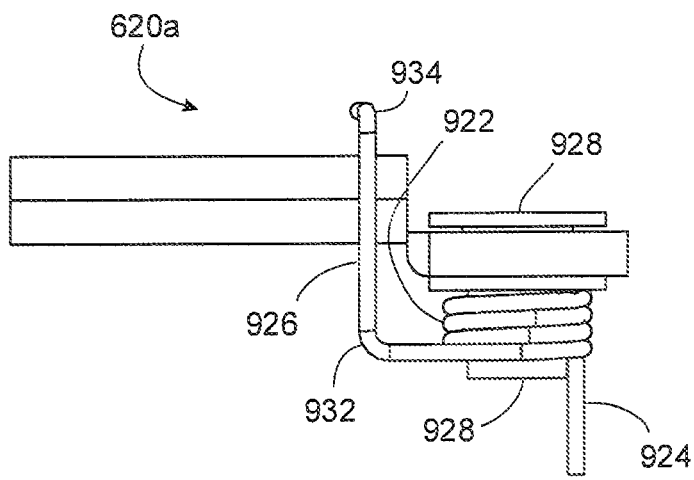
FIG. 9A is a detailed side view of a torsion spring coupled to an end of a cable.
Figure 9B:
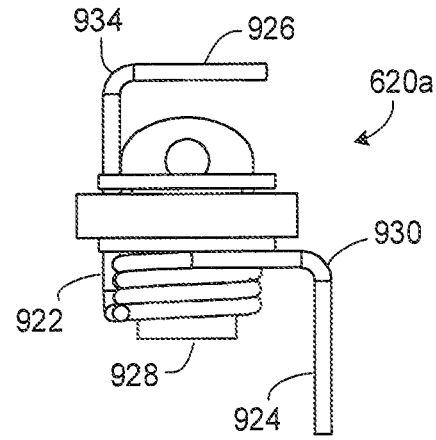
FIG. 9B is a detailed end view of a torsion spring coupled to an end of a cable.
Figure 9C:
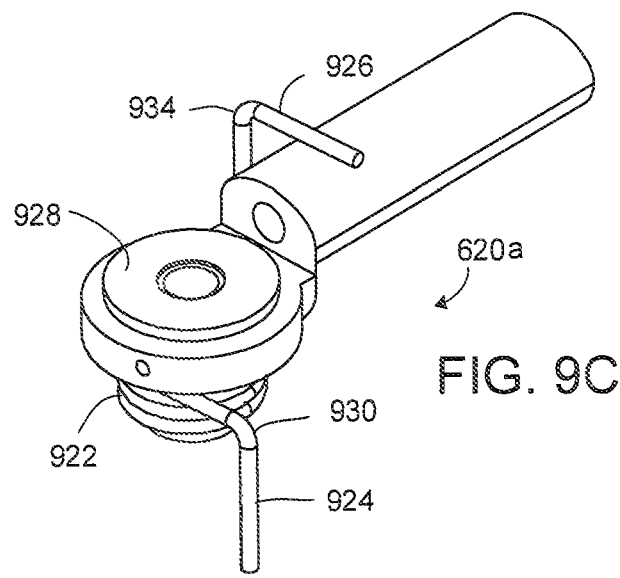
FIG. 9C is a perspective view of a torsion spring coupled to an end of a cable.

FIGS. 9A-9C are detailed views showing one of the elastic elements (i.e., elastic element 620a) in FIGS. 6-8 coupled to an end portion of cable assembly 101d.

The illustrated elastic element is a torsion spring (i.e., a flexible elastic object that stores mechanical energy when twisted). The torsion spring is an elastic device that forms a helical portion 922, a first end portion 924 and a second end portion 926.

The first end portion of the torsion spring is wrapped several times around the shaft of the fastening element 928 (e.g., a screw or bolt) that is used to secure the cable assembly to the orbital plate 103. A first end 924 of the torsion spring extends away from the helical portion 922 and has a 90 degree bend 930 and extends in a first (downward) direction parallel to an axis of the fastening element 928. A second end 926 of the torsion spring extends away from the helical portion 922 and has a first 90 degree bend 932 and a second 90 degree bend 934. After the first 90 degree bend, it extends first in an upward direction parallel to the axis of the helical portion 922 and then, after the second 90 degree bend, in a direction perpendicular to the axis of the helical portion 922. Therefore, the distal portion of the second end 926 is configured so that it can extend up and over the top of the cable assembly.

When installed on the cinch valve 600, the first end 924 of each torsion spring extends into a hole in the orbital plate 103 and the second end 926 extends up and over the top of the cable assembly. Thus, the first end 924 remains in a substantially fixed position relative to the orbital plate 103, whereas the second end 926 moves with its associated cables (e.g., 101) as the cables move between an open position and the closed (or woven) position. As the cables moves toward the closed (or woven) position, the tension in the torsion spring increases.

A number of implementations have been described. Nevertheless, it will be understood that various modifications may be made without departing from the spirit and scope of the invention.

Figure 10:
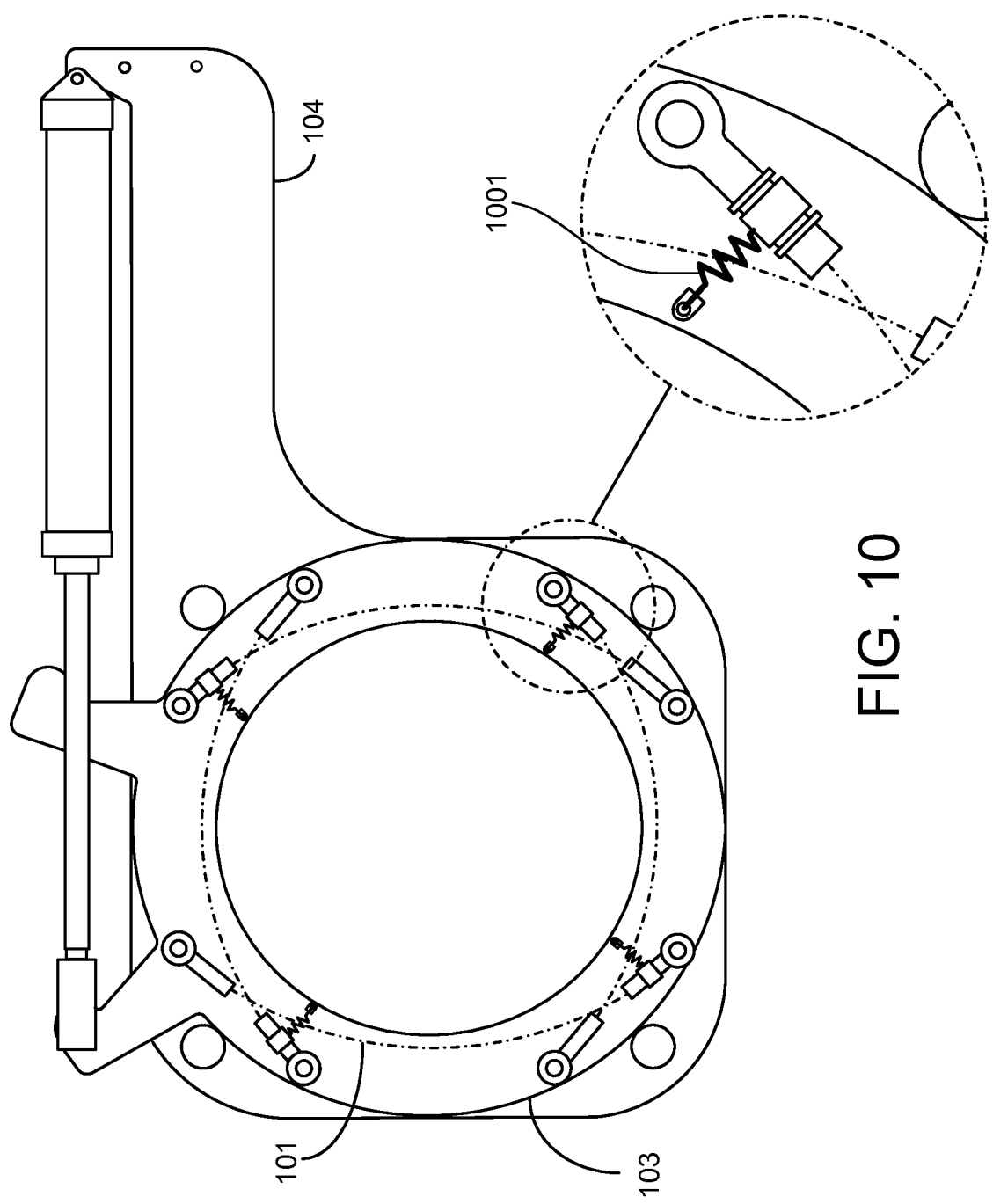
FIG. 10 is a partial top view of a cinch valve with compression springs.

For example, the elastic members need not be torsion springs. Instead, one or more of the elastic members may be a compression spring (FIG. 10, element 1001) configured such that when the plurality of cables converge to form the woven closure, the compression spring is compressed and exerts a force that tends to push a corresponding one of the cables out of the woven closure. In this regard, one end of the compression spring may be connected to the cable (or cable connecting lug) and the other end of the compression spring may be connected to either the orbital plate or upper fixed mounting plate. The compression springs may be arranged proximate one or both ends of each cable.

Figure 11:
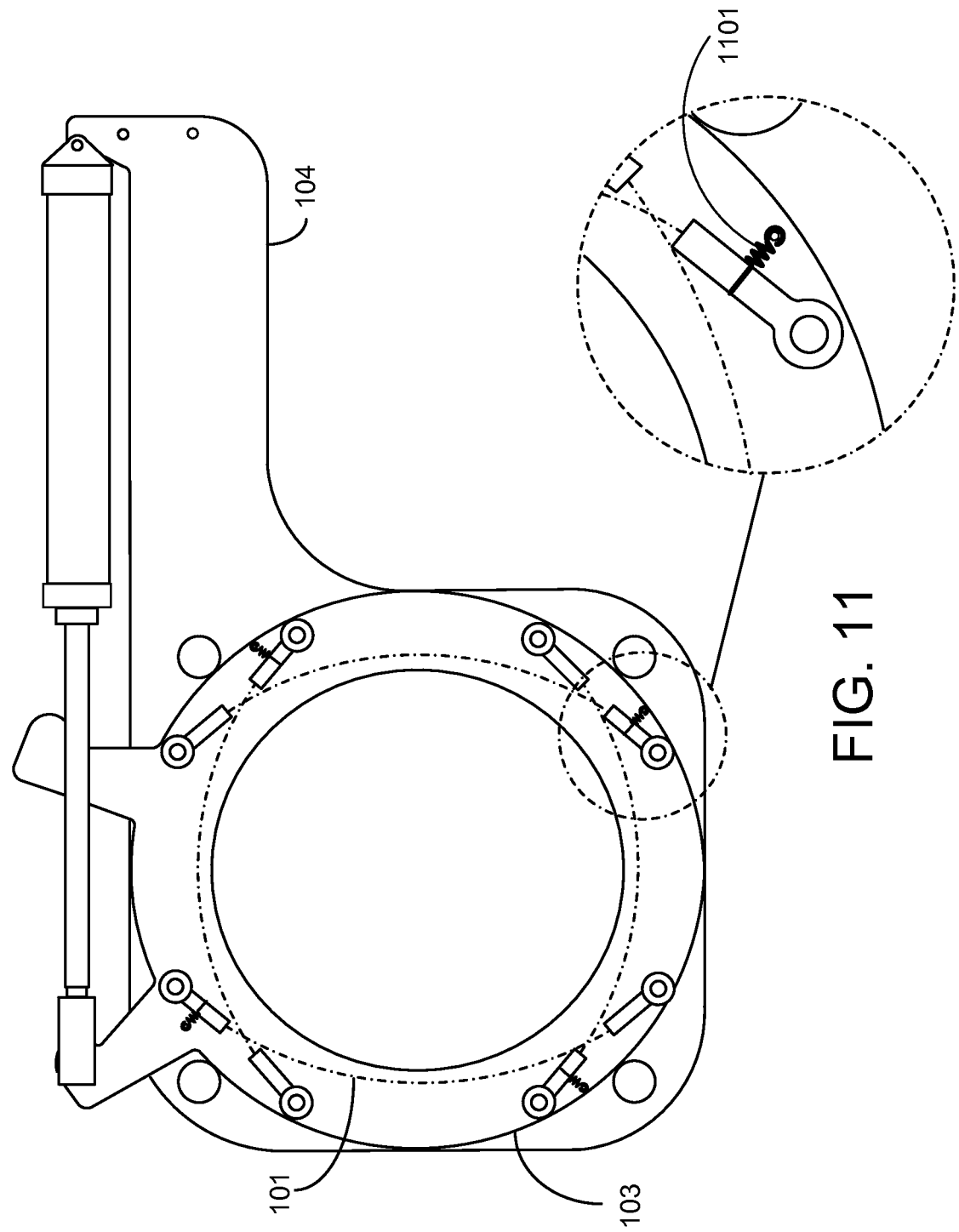
FIG. 11 is a partial top view of a cinch valve with extension springs.

Similarly, one or more of the elastic members may be an extension spring (FIG. 11, element 1101) configured such that when the plurality of cables converge to form the woven closure, the extension spring is stretched and exerts a force that tends to pull a corresponding one of the cables out of the woven closure. In this regard, one end of the extension spring may be connected to the cable (or cable connecting lug) and the other end of the extension spring may be connected to either the orbital plate or upper fixed mounting plate. The extension springs may be arranged proximate one or both ends of each cable.

Moreover, each elastic member can be any type of flexible or stretchable material that is configured in such a way that when a corresponding one of the cables is moved toward or into the woven closure position, the flexible or stretchable material tends to urge the cable out of the woven position.

In some implementations, the cinch valve includes a first elastic device proximate a first end of each cable and a second elastic device proximate the second end of the each cable.

The second ends 926 of the flexible elastic devices need not necessarily bend around the cables. In general, it will suffice if the second ends 926 contact their respective cables (or cable assemblies) so as to urge the cables in an appropriate direction.

Moreover, the elastic elements disclosed in the figures herein contact a connecting lug at an end of each cable. However, in some implementations, the elastic elements can be arranged so that they instead contact the flexible portion of the cable assembly (e.g., the cable itself).

The cinch valve 600 that includes the elastic elements can be incorporated into a bulk bag unloader assembly in a manner similar to how the cinch valve 100 is incorporated into the bulk bag unloader assembly in FIG. 3.

Accordingly, other implementations are within the scope of the claims.

What is claimed is:

1. A cinch valve comprising:
    a first plate comprising a first aperture;
    an orbital plate comprising a second aperture substantially aligned with the first aperture;
    a plurality of cables, each cable having a first end coupled to the first plate and a second end coupled to the orbital plate, wherein the orbital plate is arranged to rotate relative to the first plate between a first position and a second position thereby causing the cables to converge to form a woven closure; and
    one or more elastic devices arranged with their longitudinal axes in a direction normal to that of a respective one of the cables and with their longitudinal axes in the same plane as that of a respective one of the cables such that when the plurality of cables converge to form the woven closure, each elastic device urges the respective one of the cables in a direction that tends to open the woven closure.

2. The cinch valve of claim 1 wherein each cable comprises multiple strands of wire and a coating material coupled to the multiple strands of wire.

3. The cinch valve of claim 2 wherein the coating material is selected from the group consisting of plastic and rubber.

4. The cinch valve of claim 1 wherein the first end of each cable is coupled to the first plate with a first fastener that extends into the first plate, and the second end of each cable is coupled to the orbital plate with a second fastener that extends into the orbital plate.

5. The cinch valve of claim 1 wherein each elastic device is a compression spring configured such that when the plurality of cables converge to form the woven closure, the compression spring is compressed and exerts a force that tends to push a corresponding one of the cables out of the woven closure.

6. The cinch valve of claim 1 wherein each elastic device is an extension spring configured such that when the plurality of cables converge to form the woven closure, the extension spring is stretched and exerts a force that tends to pull a corresponding one of the cables out of the woven closure.

7. The cinch valve of claim 1 wherein the one or more elastic devices comprise:
    a first elastic device proximate the first end of each cable; and
    a second elastic device proximate the second end of the each cable.

8. The cinch valve of claim 1 wherein the plurality of cables comprises four cables, and wherein in the first position, a flexible portion proximate to the first end of the first cable overlaps a flexible portion proximate to the second end of the third cable, a flexible portion proximate to the first end of the fourth cable overlaps a flexible portion proximate to the second end of the first cable, a flexible portion proximate to the first end of the second cable overlaps a flexible portion proximate to the second end of the fourth cable, and a flexible portion proximate to the first end of the third cable overlaps a flexible portion proximate to the second end of the second cable.

9. The cinch valve of claim 8 wherein in the woven closure, a flexible portion of the first cable passes over a flexible portion of the third cable and passes under a flexible portion of the fourth cable, a flexible portion of the second cable passes under a flexible portion of the third cable and passes over a flexible portion of the fourth cable, a flexible portion of the third cable passes under a flexible portion of the first cable and passes over a flexible portion of the fourth cable, and a flexible portion of the fourth cable passes over a flexible portion of the first cable and passes under a flexible portion of the second cable.

10. The cinch valve of claim 1 further comprising an actuator coupled to the orbital plate and operable to cause the orbital plate to rotate, relative to the first plate, between the first position and the second position.

11. The cinch valve of claim 1 wherein the cables are configured such that when the cables form the woven closure, each cable passes over two of the cables then under two of the cables, one of which is one of the cables it passed over.

12. A cinch valve comprising:
    a first plate comprising a first aperture;
    an orbital plate comprising a second aperture substantially aligned with the first aperture;
    a plurality of cables, each cable having a first end coupled to the first plate and a second end coupled to the orbital plate, wherein the orbital plate is arranged to rotate relative to the first plate between a first position and a second position thereby causing the cables to converge to form a woven closure;
    one or more elastic devices arranged with their longitudinal axes in a direction normal to that of a respective one of the cables such that when the plurality of cables converge to form the woven closure, each elastic device urges the respective one of the cables in a direction that tends to open the woven closure;
    a lower plate having a third aperture substantially aligned with the first and second apertures, wherein the orbital plate is disposed between the first and lower plates; and
    a plurality of grooved bearings coupled to the first and lower plates, each grooved bearing comprising a groove arranged to receive an edge of the orbital plate.

13. A bulk bag unloading apparatus comprising:
    a frame arranged to support a bulk bag;
    a cinch valve coupled to the frame and disposed proximate to a spout end of the frame, the cinch valve comprising:
        a first plate comprising a first aperture;
        an orbital plate comprising a second aperture substantially aligned with the first aperture, wherein the orbital plate is arranged to rotate relative to the first plate between a first position and a second position;
        a plurality of cables, each cable having a first end coupled to the first plate and a second end coupled to the orbital plate, wherein rotation of the orbital plate from the first position to the second position causes the plurality of cables to converge and form a woven closure; and
        one or more elastic devices, wherein the elastic devices are arranged with their longitudinal axes in a direction normal to that of a corresponding one of the cables and with their longitudinal axes in the same plane as that of a respective one of the cables such that when the plurality of cables converge to form the woven closure, each elastic device urges the corresponding one of the cables in a direction tending to open the woven closure.

14. The bulk bag unloading apparatus of claim 13 wherein each cable comprises multiple strands of wire and a coating material coupled to the multiple strands of wire.

15. The bulk bag unloading apparatus of claim 14 wherein the coating material is selected from the group consisting of plastic and rubber.

16. The bulk bag unloading apparatus of claim 13 wherein the first end of each cable is coupled to the first plate with a first fastener that extends into the first plate, and the second end of each cable is coupled to the orbital plate with a second fastener that extends into the orbital plate.

17. The bulk bag unloading apparatus of claim 13 wherein each elastic device is a compression spring configured such that when the plurality of cables converge to form the woven closure, the compression spring is compressed and exerts a force that tends to push a corresponding one of the cables out of the woven closure.

18. The bulk bag unloading apparatus of claim 13 wherein each elastic device is an extension spring configured such that when the plurality of cables converge to form the woven closure, the extension spring is stretched and exerts a force that tends to pull a corresponding one of the cables out of the woven closure.

19. The bulk bag unloading apparatus of claim 13 wherein the one or more elastic devices comprise:
   a first elastic device proximate the first end of each cable; and
   a second elastic device proximate the second end of the each cable.

20. The bulk bag unloading apparatus of claim 13, wherein the plurality of cables comprises four cables, and wherein in the first position, a flexible portion proximate to the first end of the first cable overlaps a flexible portion proximate to the second end of the third cable, a flexible portion proximate to the first end of the fourth cable overlaps a flexible portion proximate to the second end of the first cable, a flexible portion proximate to the first end of the second cable overlaps a flexible portion proximate to the second end of the fourth cable, and a flexible portion proximate to the first end of the third cable overlaps a flexible portion proximate to the second end of the second cable.

21. The bulk bag unloading apparatus of claim 20, wherein in the woven closure, a flexible portion of the first cable passes over a flexible portion of the third cable and passes under a flexible portion of the fourth cable, a flexible portion of the second cable passes under a flexible portion of the third cable and passes over a flexible portion of the fourth cable, a flexible portion of the third cable passes under a flexible portion of the first cable and passes over a flexible portion of the fourth cable, and a flexible portion of the fourth cable passes over a flexible portion of the first cable and passes under a flexible portion of the second cable.

22. The bulk bag unloading apparatus of claim 13, wherein the cinch valve further comprises an actuator coupled to the orbital plate and operable to cause the orbital plate to rotate, relative to the first plate, between the first position and the second position.

23. The bulk bag unloading assembly of claim 13 further comprising:
   a paddle-type unloader or vibratory unloader coupled to the frame and disposed proximate to the spout end of the frame.

24. A bulk bag unloading apparatus comprising:
   a frame arranged to support a bulk bag;
   a cinch valve coupled to the frame and disposed proximate to a spout end of the frame, the cinch valve comprising:
      a first plate comprising a first aperture;
      an orbital plate comprising a second aperture substantially aligned with the first aperture, wherein the orbital plate is arranged to rotate relative to the first plate between a first position and a second position;
      a plurality of cables, each cable having a first end coupled to the first plate and a second end coupled to the orbital plate, wherein rotation of the orbital plate from the first position to the second position causes the plurality of cables to converge and form a woven closure;
      one or more elastic devices, wherein the elastic devices are arranged with their longitudinal axes in a direction normal to that of a corresponding one of the cables such that when the plurality of cables converge to form the woven closure, each elastic device urges the corresponding one of the cables in a direction tending to open the woven closure;
      a lower plate having a third aperture substantially aligned with the first and second apertures, wherein the orbital plate is disposed between the first and lower plates; and
      a plurality of grooved bearings coupled to the first and lower plates, each grooved bearing comprising a groove arranged to receive an edge of the orbital plate.

25. A cinch valve comprising:
   a first plate comprising a first aperture;
   an orbital plate comprising a second aperture substantially aligned with the first aperture;
   a plurality of cables, each cable having a first end coupled to the first plate and a second end coupled to the orbital plate, wherein the orbital plate is arranged to rotate relative to the first plate between a first position and a second position thereby causing the cables to converge to form a woven closure; and
   one or more torsion springs arranged such that when the plurality of cables converge to form the woven closure, each torsion spring urges a respective one of the cables in a direction that tends to open the woven closure;
   wherein the first end of each cable is coupled to the first plate with a first fastener that extends into the first plate, and the second end of each cable is coupled to the orbital plate with a second fastener that extends into the orbital plate; and
   wherein each torsion spring comprises:
      a substantially helical body portion that is wrapped around a respective one of the first or second fasteners;
      a base portion that extends from a first end of the substantially helical body portion and is coupled either to the first plate or to the orbital plate; and
      a cable urging portion that extends from a second end of the substantially helical body portion and provides a physical impetus urging a corresponding one of the cables in a direction that opens the woven closure.

26. The cinch valve of claim 25, wherein the plurality of cables comprises four cables, and wherein in the first position, a flexible portion proximate to the first end of the first cable overlaps a flexible portion proximate to the second end of the third cable, a flexible portion proximate to the first end of the fourth cable overlaps a flexible portion proximate to the second end of the first cable, a flexible portion proximate to the first end of the second cable overlaps a flexible portion proximate to the second end of the fourth cable, and a flexible portion proximate to the first end of the third cable overlaps a flexible portion proximate to the second end of the second cable.

27. A bulk bag unloading apparatus comprising:
   a frame arranged to support a bulk bag;
   a cinch valve coupled to the frame and disposed proximate to a spout end of the frame, the cinch valve comprising:
      a first plate comprising a first aperture;
      an orbital plate comprising a second aperture substantially aligned with the first aperture, wherein the orbital plate is arranged to rotate relative to the first plate between a first position and a second position;

a plurality of cables, each cable having a first end coupled to the first plate and a second end coupled to the orbital plate, wherein rotation of the orbital plate from the first position to the second position causes the plurality of cables to converge and form a woven closure; and one or more torsion springs arranged such that when the plurality of cables converge to form the woven closure, each torsion spring urges a corresponding one of the cables in a direction tending to open the woven closure;

wherein the first end of each cable is coupled to the first plate with a first fastener that extends into the first plate, and the second end of each cable is coupled to the orbital plate with a second fastener that extends into the orbital plate, and each torsion spring comprises:

a substantially helical body portion that is wrapped around a respective one of the first or second fasteners;

a base portion that extends from a first end of the substantially helical body portion and is coupled either to the first plate or to the orbital plate; and a cable urging portion that extends from a second end of the substantially helical body portion and provides a physical impetus urging a corresponding one of the cables in a direction that opens the woven closure.

28. The bulk bag unloading apparatus of claim 27, wherein the plurality of cables comprises four cables, and wherein in the first position, a flexible portion proximate to the first end of the first cable overlaps a flexible portion proximate to the second end of the third cable, a flexible portion proximate to the first end of the fourth cable overlaps a flexible portion proximate to the second end of the first cable, a flexible portion proximate to the first end of the second cable overlaps a flexible portion proximate to the second end of the fourth cable, and a flexible portion proximate to the first end of the third cable overlaps a flexible portion proximate to the second end of the second cable.

\* \* \* \* \*